United States Patent Office 3,104,156
Patented Sept. 17, 1963

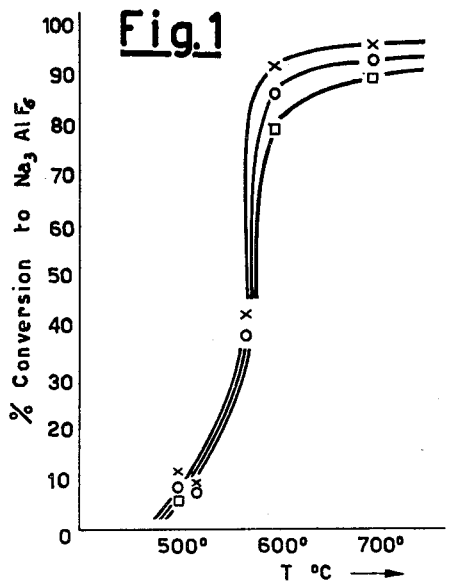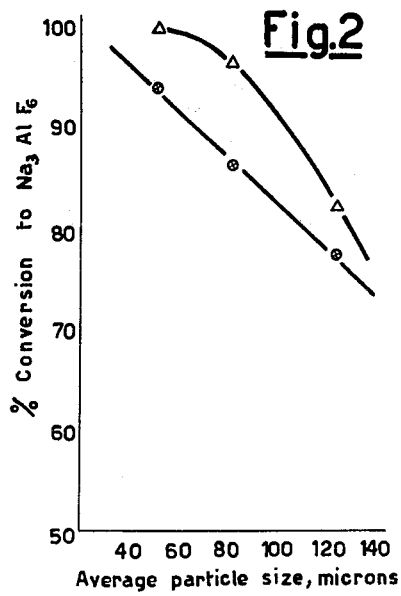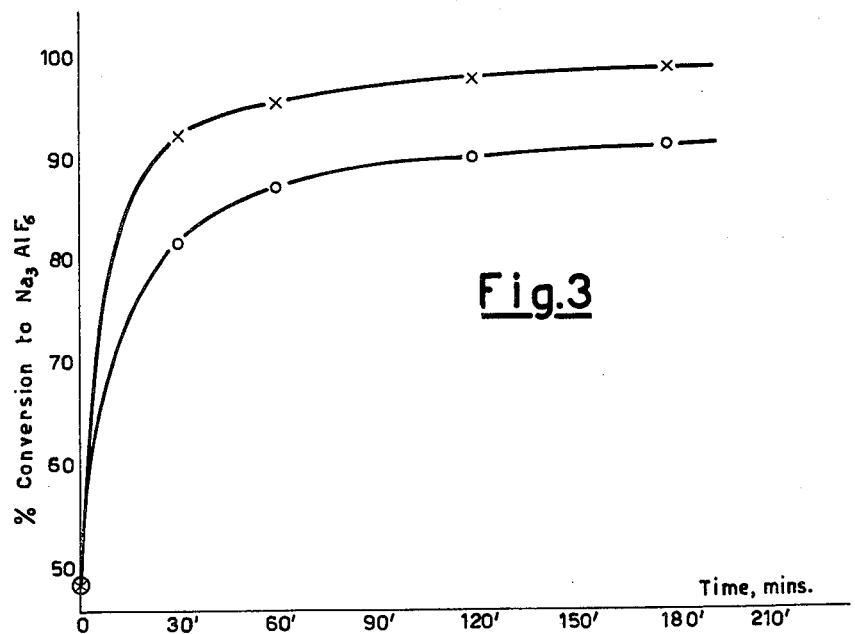

3,104,156
DRY PROCESS FOR OBTAINING TECHNICALLY PURE CRYOLITE BY DIRECT CONTACT OF THE REAGENTS
Pietro Saccardo and Franco Gozzo, Milan, Italy, assignors to Sicedison S.p.A., Milan, Italy, a company of Italy
Filed Feb. 23, 1961, Ser. No. 91,025
Claims priority, application Italy Mar. 3, 1960
4 Claims. (Cl. 23—88)

Up to the present time all the methods employed for the production of synthetic cryolite have been based on the reaction of fluorine-containing acids (such as hydrofluoric acid, fluoboric acid, silicofluoric acid) with compounds of sodium and aluminum.

The most commonly employed processes are based on a water solution reaction from which the complex salt $Na_3AlF_6$ is obtained by precipitation. Although they differ from each other in the raw materials used, such processes have in common a series of operations—the use of large quantities of solution, pH and temperature control, the filtration and calcination of the product—all of which, together with need for exercising particular care in choosing raw materials of the right composition, have considerable effect on the cost of the product.

To this should be added, moreover, the serious difficulty of obtaining by precipitation a salt with a definite formula on account of the well known fact that other simple and complex salts such as, for example, $AlF_3$ and chiolite, tend to be precipitated with the cryolite thus altering its composition and physico-chemical properties.

In addition to water solution reactions, the fluid bed technique has been known for some time and is employed with advantage for transforming basic compounds into neutral salts through the agency of acids in a gaseous state. The simplicity and efficiency of plants which allow a reaction to take place directly between a solid substance in particle form and a continuous flow of gas passing over the bed thereof, are such as to render this technique clearly superior to the normal solution reaction methods and to cause it to be preferred in every case where reagents in the solid and gaseous states are available.

With regard to neutral fluorides, there has already been developed, for example, the fluidizing process for obtaining aluminum fluoride from aluminum oxide or hydrate and gaseous hydrofluoric acid. In the prior art we also have the idea of bringing gaseous HF into contact with a solid mixture of compounds of sodium ($Na_2CO_3$) and alumina ($Al_2O_3 \cdot nH_2O$) previously formed into pellets, at temperatures between 400° C. and 510° C., with the object of producing fluorine derivatives of aluminum of similar composition to cryolite ($3NaF \cdot AlF_3$).

However, the product which can be obtained under these conditions, irrespective of how the two reagents are brought into contact, is found to be a mechanical mixture of sodium fluoride and aluminum fluoride with an altogether negligible cryolite content.

Not even an increase in temperature to 560°–580° C. is enough to cause the sodium, aluminum and fluorine to become chemically bound together to any appreciable extent. And if the reaction temperature is kept at over 560°–580° C., the solid material agglomerates into large, hard, compact lumps which prevent the HF gas from giving an efficient reaction and thus cause the product to be inferior and uneconomic.

The main object of the present invention is to provide an improved process whereby the formation of a chemical bond between Na, Al and F in molecules having the reticular properties of cryolite is brought about to a substantial extent by means of the passage of gaseous HF over a fluid bed of particles composed of sodium and aluminum compounds mechanically mixed together.

A further object of the present invention is to obtain substantial yields of crystallographically pure cryolite according to a dry process which comprises a single stage of reaction through direct contact of sodium fluoride and aluminum fluoride, thus avoiding all the disadvantages inherent in the wet processes.

It has been found, surprisingly, that through the simple contact in a mixture of powdered sodium fluoride and aluminum fluoride in the molar ratio of 3:1, the following solid state reaction takes place on a substantial scale at temperatures well below the melting points of the individual constituents:

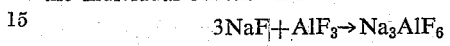
$$3NaF + AlF_3 \rightarrow Na_3AlF_6$$

This reaction occurs by sintering at ambient pressure without the solid mixture being interfered with mechanically or chemically in any way. It starts at below 500° C. and is found to develop particularly fast at over 570° C. as may be observed from the graph in FIG. 1 in which temperature in degrees centigrade is shown along the abscissa and percentage conversion to cryolite along the ordinate, for granular finenesses of between 150 and 200 mesh, curve X corresponding to a process time of 3 hours, curve O to one of 2 hours and curve □ to one of 1 hour.

At temperatures between 600° C. and 700° C. the extent of conversion of the two fluorides into $Na_3AlF_6$ in two hours exceeds 90%. The kinetics of this solid state reaction depend, of course, on the fineness of the powdered solid reagents as shown in the graph in FIG. 2 where the conversion percentage is shown as a function of the average diameter of the solid particles, processing time in the oven remaining constant at 2 hours, for two different temperatures (curve Δ: 700° C; curve ⊗:600°–700° C.).

Fluorides of sodium and aluminum prepared in any way may be used for the process which is the subject of the present invention, provided that they are in the solid state and substantially anhydrous. Excellent results have been obtained by heating solid mixtures composed of NaF, $AlF_3$ and $Na_3AlF_6$ obtained by dry process according to technique already known to those skilled in the art. In order to obtain a particularly good conversion factor between the solid reagents, it has been found advantageous to prepare the two fluorides (NaF and $AlF_3$) according to the fluid bed technique, replacing a small proportion of the sodium carbonate used with an equal quantity of sodium chloride.

It has been found that the replacement of part of the sodium carbonate with an equal quantity of sodium chloride, allows the solid mixture undergoing the action of the HF to come out of the reactor without having been agglomerated into lumps, and converted, for the most part, into cryolite, the remainder consisting of NaF and $AlF_3$ and a small quantity (2–3%) of unconverted $Al_2O_3$.

In this manner, the presence of a good proportion of cryolite with the two fluorides enables the sinterizing process of the present invention to produce high yields of extremely pure cryolite of stable chemical structure.

In FIG. 3 there is plotted, purely for illustrative purposes, the curve of development of such a sinterizing reaction over time, for a mixture 48% converted into cryolite at a temperature of 700° C. in the fluid bed reactor, whence it is extracted, in which curve X relates to a grain measurement smaller than 150 mesh, whilst curve O relates to one of 100–150 mesh.

The process to which the present invention relates permits, through an appropriate combination of the two stages of reaction, respectively in a fluid bed and in the solid state, the conversion of reagents in common use such as aluminum fluoride, soda ash and sodium chloride, into cryolite with the required molar ratio, without loss and with very simple handling.

There are given below, purely for illustrative purposes, two examples of how the process according to the invention may be put into effect, starting respectively with the fluorides of Na and Al alone and with said fluorides together with cryolite.

*Example No. 1*

A mixture consisting of 63 parts by weight of NaF and 44 parts of $AlF_3$ is finely ground to a Tyler mesh size of below 150. The powder thereby obtained is compressed into capsules and heated for about two hours at about 700° C.

The product obtained is found by chemical and roentgenographic analysis to consist of 94% cryolite ($Na_3AlF_6$) and 2.8% $Al_2O_3$, the remainder consisting of the original undecomposed fluorides.

*Example No. 2*

A mixture containing 43.65% of $Na_3AlF_6$, 32.15% of NaF, 21.7% of $AlF_3$ and 2.5% of $Al_2O_3$ obtained by fluorination with HF gas in a fluid bed of a mixture of $Na_2CO_3$, NaCl and $Al_2O_3$ in equal quantities, is ground to a Tyler mesh size under 200 and compressed into capsules. After heating for 30 minutes in an over at 720° C., a product was obtained which chemical and reentgenographic analysis showed to have the following composition:

$$NaF = 0\%;\ AlF_3 = 0\%;\ Al_2O_3 = 3\%$$
$$\text{cryolite } (Na_3AlF_6) = 97\%$$

It is manifest that the present invention can be employed with advantage to produce cryolite also from anhydrous sodium and aluminum fluorides prepared in any way, and also to produce double fluorides of any kind even if separately prepared with different techniques from the fluid bed.

We claim:

1. A process for obtaining synthetic cryolite, which consists in heating an intimate and homogeneous mixture of sodium fluoride and aluminum fluoride, both substantially anhydrous and in the solid state and in the molar ratio of 3:1 and comprising particles which have a mesh size between 150 and 200, for from thirty minutes to three hours at temperatures over 570° C. and lower than 720° C.

2. A process for obtaining synthetic cryolite according to claim 1, in which said intimate and homogeneous mixture of sodium fluoride and aluminum fluoride is ground to the mesh size between 150 and 200, and formed into briquettes prior to heating.

3. A process according to claim 1 characterized in that said mixture of aluminum fluoride and sodium fluoride is first added to cryolite and then formed into briquettes prior to heating.

4. A process according to claim 2 characterized in that said mixture of aluminum fluoride and sodium fluoride is first added to cryolite and then formed into briquettes prior to the heating.

References Cited in the file of this patent
UNITED STATES PATENTS

| | | |
|---|---|---|
| 2,305,921 | Eringer | Dec. 22, 1942 |
| 2,382,327 | Miles | Aug. 14, 1945 |
| 2,418,074 | Kawecki | Mar. 25, 1947 |
| 2,592,113 | Brodal et al. | Apr. 8, 1952 |
| 2,888,319 | Gloss | May 26, 1959 |

FOREIGN PATENTS

| | | |
|---|---|---|
| 541,609 | Canada | May 28, 1957 |

OTHER REFERENCES

Mellor: "Comprehensive Treatise on Inorganic and Theoretical Chemistry," volume 5, page 305 (1924), Longmans, Green and Company, New York.